(12) United States Patent
Pandian et al.

(10) Patent No.: US 11,821,498 B2
(45) Date of Patent: Nov. 21, 2023

(54) POLYMERIC THREAD INSERT FOR HIGH LOAD LEADSCREW AND NUT

(71) Applicant: Hamilton Sundstrand Corporation, Charlotte, NC (US)

(72) Inventors: Navaneethakrishnan Pandian, Karnataka (IN); Subrahmanyam Veerarapu, Bengaluru (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/533,646

(22) Filed: Nov. 23, 2021

(65) Prior Publication Data

US 2023/0111019 A1 Apr. 13, 2023

(30) Foreign Application Priority Data

Sep. 28, 2021 (IN) .............................. 202111043954

(51) Int. Cl.
*F16H 25/24* (2006.01)
*B64C 13/00* (2006.01)

(52) U.S. Cl.
CPC ............. *F16H 25/24* (2013.01); *B64C 13/00* (2013.01); *F16H 2025/249* (2013.01)

(58) Field of Classification Search
CPC ....... F16H 25/22; F16H 25/24; F16H 25/2025
See application file for complete search history.

(56) References Cited

U.S. PATENT DOCUMENTS

| | | | | |
|---|---|---|---|---|
| 2,152,681 A | * | 4/1939 | Caminez | F16B 37/12 123/195 P |
| 2,341,670 A | * | 2/1944 | Stinson | E21B 17/042 29/447 |
| 2,995,948 A | * | 8/1961 | Galonska | F16H 25/2214 74/424.87 |
| RE25,255 E | * | 10/1962 | Brandt | F16H 25/2025 74/89.38 |
| 3,643,522 A | * | 2/1972 | Fullam | F16H 25/24 74/89.44 |

(Continued)

FOREIGN PATENT DOCUMENTS

| | | |
|---|---|---|
| CN | 105864381 A | 8/2016 |
| FR | 3031564 B1 | 1/2017 |
| JP | 2006046546 A | 2/2006 |

OTHER PUBLICATIONS

European Search Report for European Application No. 22198371.1; Action dated Jan. 17, 2023; 8 pages.

*Primary Examiner* — Bobby Rushing, Jr.
(74) *Attorney, Agent, or Firm* — CANTOR COLBURN LLP

(57) ABSTRACT

Leadscrew and nut actuators are described. The leadscrew and nut actuators include a leadscrew having an external thread and formed from a first material, a nut configured to receive the leadscrew, the nut having an internal thread and formed from a second material, and an insert arranged between the internal thread of the nut and the external thread of the leadscrew, the insert configured to transfer force between the external thread and the internal thread and prevent material contact between the leadscrew and the nut. The insert is formed of a third material different from the first material and the second material.

19 Claims, 9 Drawing Sheets

(56) References Cited

U.S. PATENT DOCUMENTS

| | | | |
|---|---|---|---|
| 4,811,618 A * | 3/1989 | Takayama | F16H 25/2427 |
| | | | 74/89.44 |
| 5,499,942 A | 3/1996 | Pflager | |
| 5,551,314 A * | 9/1996 | Andrzejewski, Jr. | ........ |
| | | | F16H 25/2266 |
| | | | 74/424.77 |
| 6,224,311 B1 * | 5/2001 | Lutkus | B05D 5/083 |
| | | | 411/178 |
| 6,685,236 B2 * | 2/2004 | Setterberg, Jr. | E21B 17/08 |
| | | | 166/207 |
| 10,077,807 B2 * | 9/2018 | Ishii | F16C 33/208 |
| 10,288,184 B2 | 5/2019 | Smith, III et al. | |
| 10,544,821 B2 | 1/2020 | Rouleau et al. | |
| 10,737,447 B2 | 8/2020 | Wilson et al. | |
| 11,084,603 B2 | 8/2021 | Martin | |
| 2009/0249910 A1 | 10/2009 | Erikson et al. | |
| 2020/0003296 A1 | 1/2020 | Somerfield | |
| 2021/0033139 A1* | 2/2021 | Stumpf | F16B 37/12 |

* cited by examiner

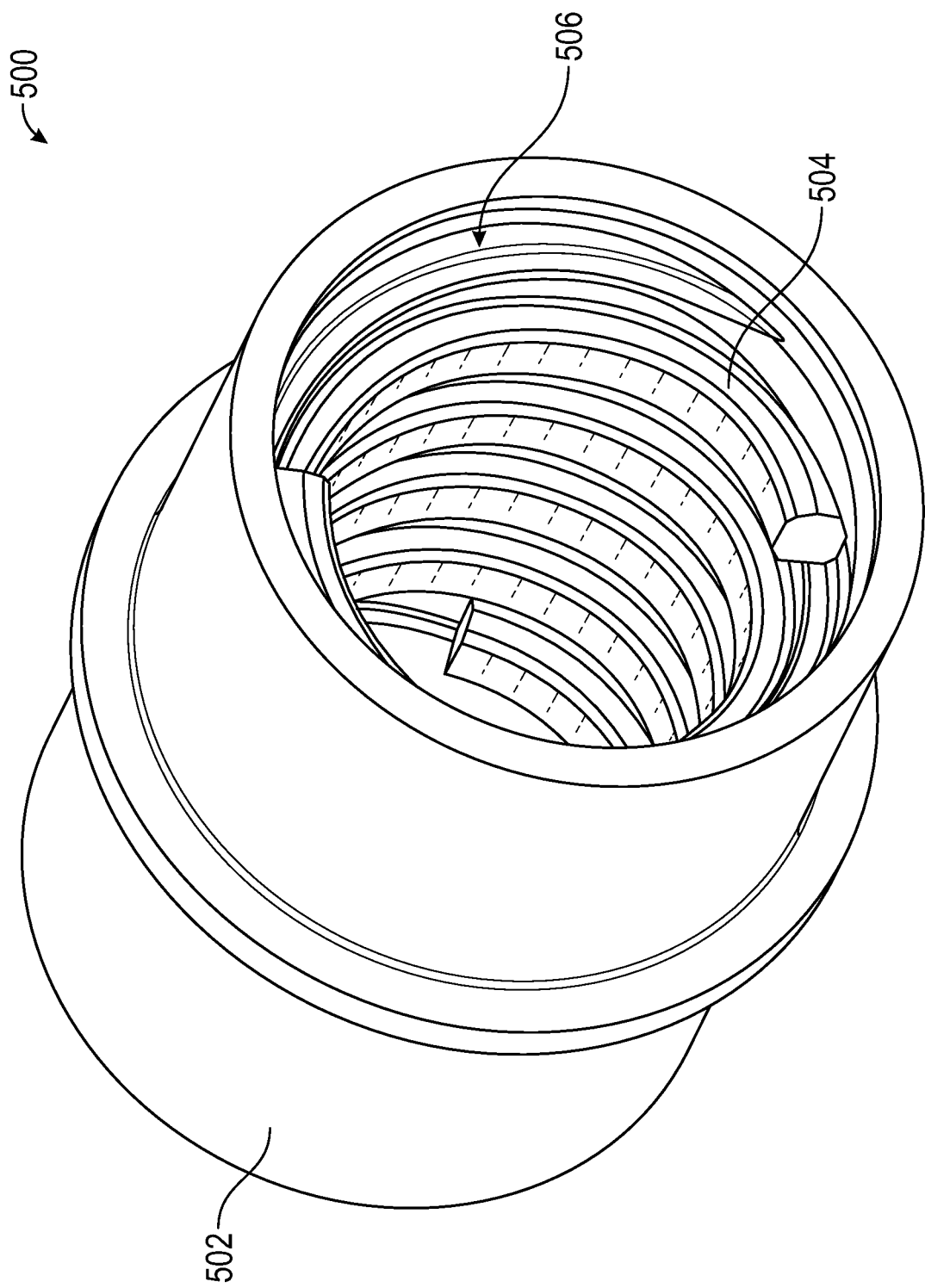

POLYMERIC THREAD INSERT FOR HIGH LOAD LEADSCREW AND NUT

CROSS-REFERENCE TO RELATED APPLICATIONS

This application claims the benefit of Indian Provisional Application No. 202111043954, filed Sep. 28, 2021, the disclosure of which is incorporated herein by reference in its entirety.

BACKGROUND

The subject matter disclosed herein generally relates to leadscrews and nuts and, more particularly, to polymeric thread inserts for high load leadscrews and nuts.

Leadscrews and nuts may be used in aircraft and avionic application for various actuations. Such actuators can include, for example, doors, flaps, thrust reverses, and the like. Conventionally, such actuators may be formed of metallic leadscrews and nuts. However, such metal-to-metal configurations can cause excess wear and/or may require additional features, such as lubrication and the like. One alternative to such metal-metal actuators is to used plastics. However, engineered plastic nuts against metallic leadscrews may have higher limiting pressure-velocity ("pv"), efficiency, low wear rate, etc., as compared to metal-metal configurations (e.g., bronze nut and metallic screws) in an unlubricated environment under low load application. An alternative is to use a polymer nut with a metallic leadscrew, which due to their low wear behavior, may be considered as low a cost alternative to metallic ball screw based drives. However, improved actuators that use a leadscrew-nut configuration may be beneficial.

SUMMARY

According to some embodiments, leadscrew and nut actuators are provided. The leadscrew and nut actuators include a leadscrew having an external thread and formed from a first material, a nut configured to receive the leadscrew, the nut having an internal thread and formed from a second material, and an insert arranged between the internal thread of the nut and the external thread of the leadscrew, the insert configured to transfer force between the external thread and the internal thread and prevent material contact between the leadscrew and the nut. The insert is formed of a third material different from the first material and the second material.

In addition to one or more of the features described herein, or as an alternative, further embodiments of the leadscrew and nut actuators may include that the first material and the second material are metals.

In addition to one or more of the features described herein, or as an alternative, further embodiments of the leadscrew and nut actuators may include that the first material and the second material are the same material.

In addition to one or more of the features described herein, or as an alternative, further embodiments of the leadscrew and nut actuators may include that the third material is a polymer.

In addition to one or more of the features described herein, or as an alternative, further embodiments of the leadscrew and nut actuators may include that the insert has a helical structure.

In addition to one or more of the features described herein, or as an alternative, further embodiments of the leadscrew and nut actuators may include that the insert is fixedly attached to the nut within the internal thread.

In addition to one or more of the features described herein, or as an alternative, further embodiments of the leadscrew and nut actuators may include that the insert is fixedly attached to the leadscrew within the external thread.

In addition to one or more of the features described herein, or as an alternative, further embodiments of the leadscrew and nut actuators may include at least one end stop fixedly attached to the leadscrew and arranged within a space between axially adjacent portions of the external thread and configured to retain the position of the insert relative to the leadscrew.

In addition to one or more of the features described herein, or as an alternative, further embodiments of the leadscrew and nut actuators may include at least one end stop fixedly attached to the nut and arranged within a space between axially adjacent portions of the internal thread and configured to retain the position of the insert relative to the nut.

In addition to one or more of the features described herein, or as an alternative, further embodiments of the leadscrew and nut actuators may include that the external thread defines a space between axially adjacent portions of the external thread, wherein the space has a geometric profile and the insert has a cross-sectional shape that matches the geometric profile of the space.

In addition to one or more of the features described herein, or as an alternative, further embodiments of the leadscrew and nut actuators may include that the internal thread defines a space between axially adjacent portions of the internal thread, wherein the space has a geometric profile and the insert has a cross-sectional shape that matches the geometric profile of the space.

In addition to one or more of the features described herein, or as an alternative, further embodiments of the leadscrew and nut actuators may include that the insert has a rounded cross-sectional shape.

In addition to one or more of the features described herein, or as an alternative, further embodiments of the leadscrew and nut actuators may include that the insert has a squared cross-sectional shape.

In addition to one or more of the features described herein, or as an alternative, further embodiments of the leadscrew and nut actuators may include an additional insert arranged between the internal thread of the nut and the external thread of the leadscrew.

In addition to one or more of the features described herein, or as an alternative, further embodiments of the leadscrew and nut actuators may include that the leadscrew is operably connected to a component of an aircraft.

In addition to one or more of the features described herein, or as an alternative, further embodiments of the leadscrew and nut actuators may include that the nut is operably connected to a component of an aircraft.

In addition to one or more of the features described herein, or as an alternative, further embodiments of the leadscrew and nut actuators may include that at least one of the leadscrew and the nut are formed of a corrosion resistant steel, titanium, a non-corrosion resistant steel, and a copper based alloy.

In addition to one or more of the features described herein, or as an alternative, further embodiments of the leadscrew and nut actuators may include that the insert is formed from one of Polyamides, PEEK, PAEK, and PTFE.

In addition to one or more of the features described herein, or as an alternative, further embodiments of the leadscrew and nut actuators may include that the material of the insert includes a filler.

In addition to one or more of the features described herein, or as an alternative, further embodiments of the leadscrew and nut actuators may include that the filler comprises graphite or carbon.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 5A is a schematic illustration of a portion of an actuator in accordance with an embodiment of the present disclosure;

DETAILED DESCRIPTION

Figure 1:
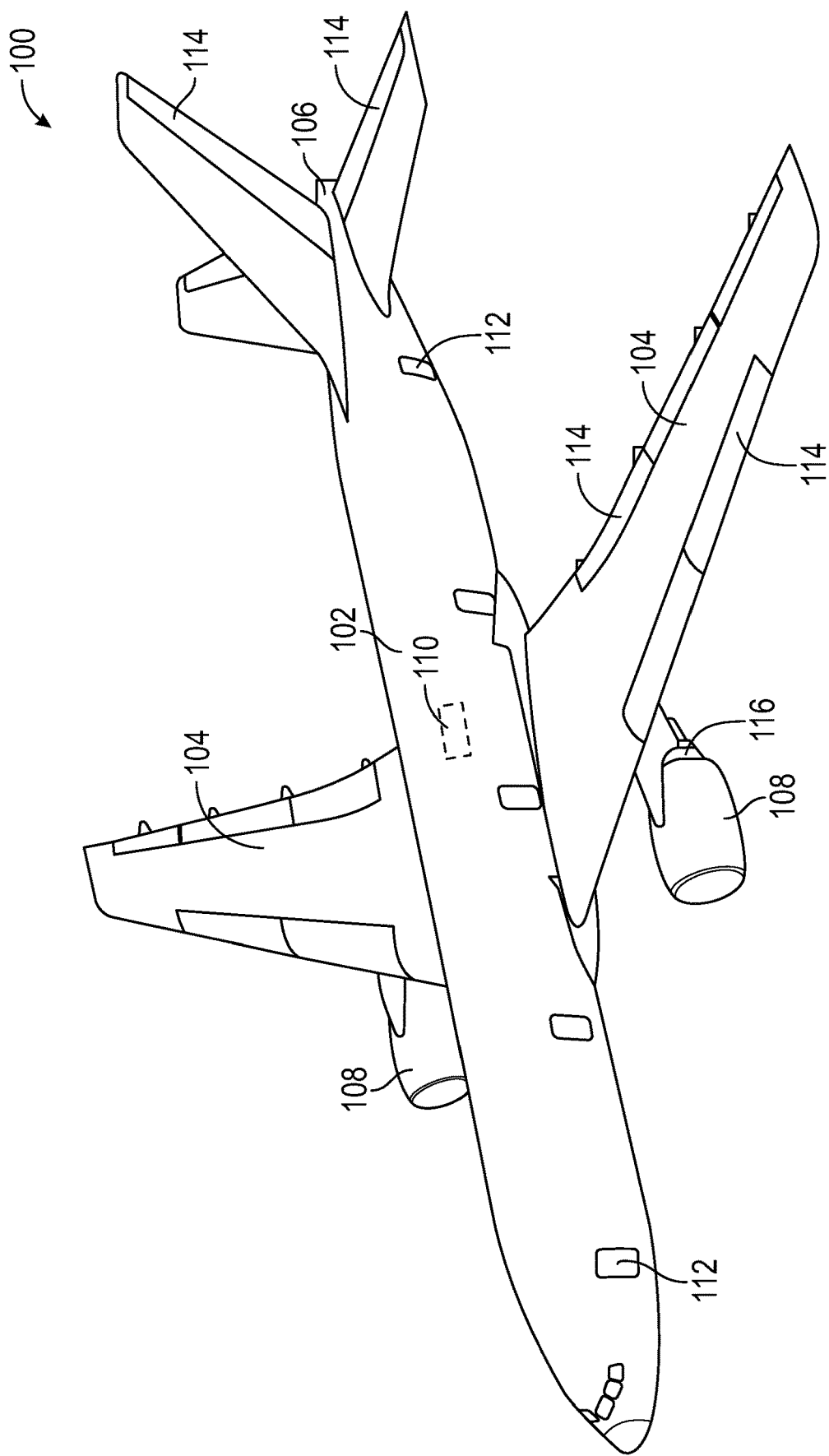
FIG. 1 is a schematic illustration of an aircraft that may incorporate embodiments of the present disclosure.

Referring to FIG. 1, a schematic illustration of an aircraft 100 that may incorporate embodiments of the present disclosure is shown. The aircraft 100 includes a fuselage 102, wings 104, and a tail 106. In this illustrated embodiment, the aircraft 100 includes wing-mounted aircraft power systems 108. The wing-mounted aircraft power systems 108 may be conventional gas turbine engines or other propulsion systems as known in the art. In other configurations, aircraft employing embodiments of the present disclosure may include fuselage-mounted and/or tail-mounted configurations. The aircraft power systems 108 may be used to generate thrust for flight and may also be used to generate onboard electrical power. The aircraft 100 may also include one or more auxiliary power units 110 that may be configured to generate power. The aircraft 100 includes doors 112 and aircraft flight control surfaces 114 (e.g., ailerons, flaps, flaperons, stabilizers, etc.). Additionally, the aircraft power systems 108 may include thrust reversers 116, as will be appreciated by those of skill in the art.

Control or actuation of various components of the aircraft 100 may be enabled through use of actuators. Actuators onboard aircraft can be used for, for example, actuating the doors 112, the flight control surfaces 114, the thrust reversers 116, landing gear, interior doors, seats, and the like. The actuators may be configured as leadscrew and nut configurations. These actuators are typically linear actuators that rotate a nut to drive the leadscrew in an axial direction along an axis of the leadscrew.

Figure 2:
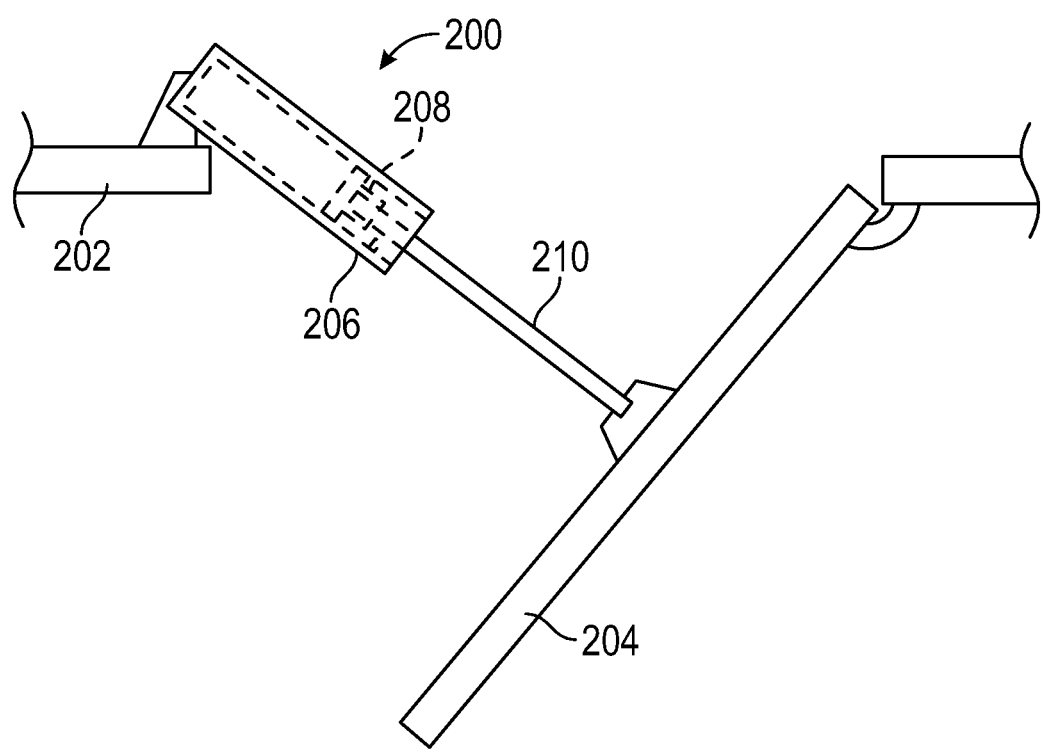
FIG. 2 is schematic illustration of an actuator that may incorporate embodiments of the present disclosure.

Referring now to FIG. 2, an actuator 200 that may incorporate embodiments of the present disclosure is shown. FIG. 2 shows part of an engine housing 202 including a door 204 moveable between a closed position and an open position. In FIG. 2, the door 204 is shown in its open position. The actuator 200 is arranged to drive the door 204 between the closed position and the open position. In the example shown, the actuator 200 is in the form of a linear actuator including a housing 206 that contains a nut 208. The nut 208 is rotatable within the housing 206 and drives linear motion of a leadscrew 210. By rotating the nut 208, the leadscrew will translate, extension and retraction, to drive the door 204 between the closed position and the open position. This type of actuation may be used for any controllable component onboard an aircraft, such as the various components described above and as appreciated by those of skill in the art.

The nut 208 may be formed of an engineered plastic that is arranged against a metallic leadscrew. Such a configuration may have higher limiting pressure-velocity ("pv"), efficiency, low wear rate, etc. as compared to metal-metal (e.g., bronze nut and metallic screw) configurations in an unlubricated environment under low load applications. However, due to their low wear behavior, polymer nuts with a metallic lead screw are considered low cost alternatives to metallic ball-screw based drives. However, such configurations are currently used for low load applications. It may be advantageous to incorporate polymers to improve operation of leadscrew-nut actuators.

Designing thread root features of plastics nuts for high load applications is a challenge due to their tensile and fatigue strength capability of polymer components. For example, contact pressure at a joint interface of a screw and a nut influences the friction coefficient and wear behavior of the interface, and such wear can cause early failure or shorten part life of such components. A wide thread flank can reduce contact pressure at the interface, however, designing a wide flank is a challenge as it further worsens the stresses at the thread root features.

In view of this and other considerations, a machined or molded helical insert made of engineered polymers can be incorporated into a metal-metal actuator. When placed between a metallic nut and a metallic leadscrew, the insert can prevent metal to metal contact, thus enabling achieving a high load system that incorporates the advantages of a plastic or polymer system. In some embodiments, the insert(s) may be held captive within the nut or to the leadscrew by mechanical or bonding means. Such captive inserts will prevent such inserts from winding out during actuation of the leadscrew. Further, in some embodiments, multiple inserts can be assembled in series to share loads and thus increase an overall load capability of the system.

Figure 3A:
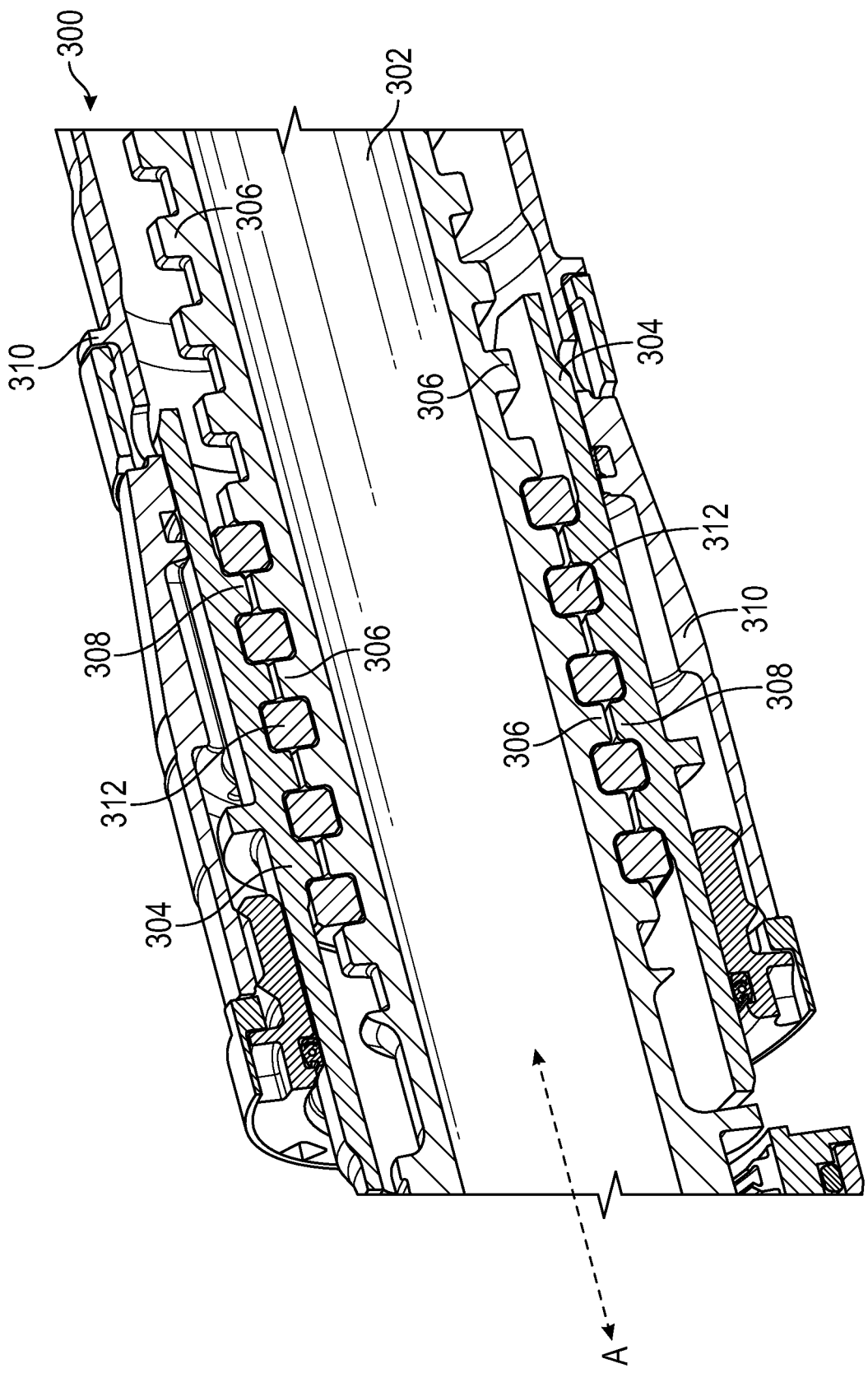
FIG. 3A is a schematic illustration of an actuator in accordance with an embodiment of the present disclosure.
Figure 3B:
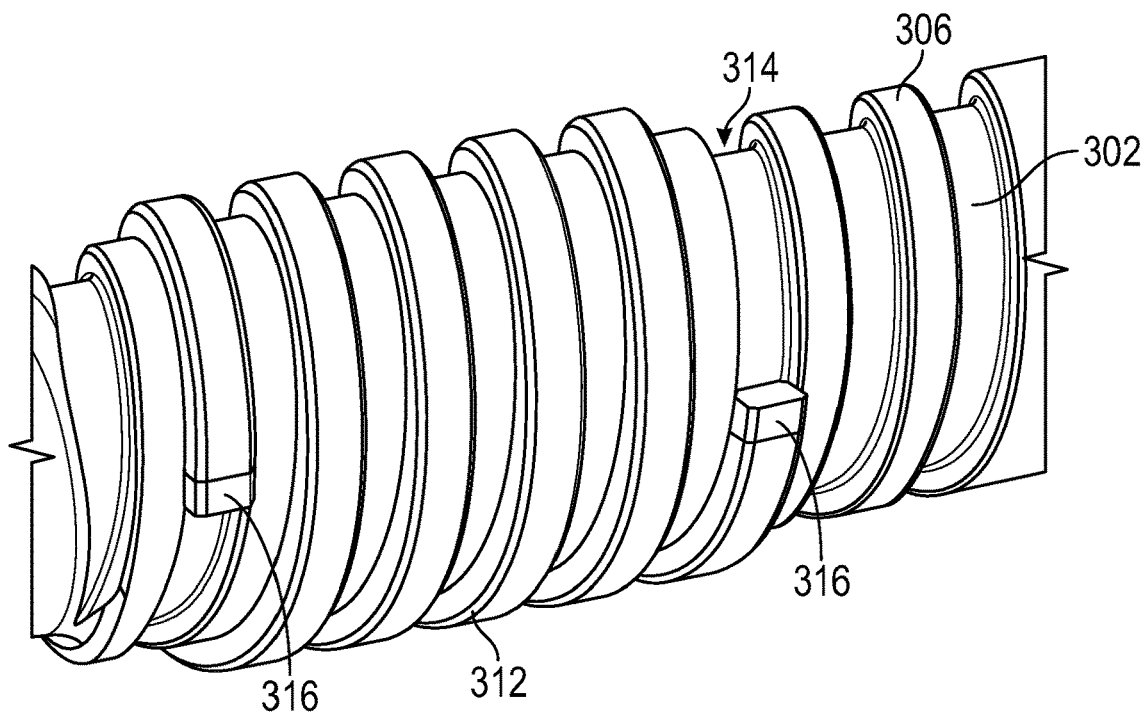
FIG. 3B is an enlarged view of a leadscrew and insert of the actuator of FIG. 3A in accordance with an embodiment of the present disclosure.
Figure 3C:
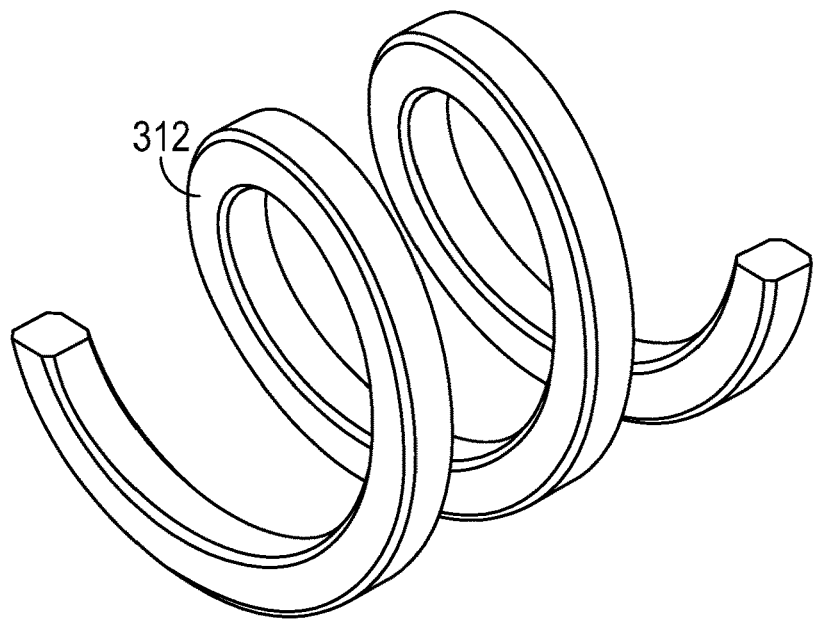
FIG. 3C is an enlarged view of the insert of the actuator of FIG. 3A in accordance with an embodiment of the present disclosure.

Turning now to FIGS. 3A-3C, schematic illustrations of an actuator 300 with an embodiment of the present disclosure are shown. The actuator 300 may be configured for use onboard an aircraft and may be installed and arranged to enable actuation or operation of one or more components, systems, or devices onboard the aircraft.

The actuator 300 includes a leadscrew 302 and a nut 304. The leadscrew 302 includes an external thread 306 and the nut 304 includes an internal thread 308. The nut 304 is arranged within a housing 310. In some embodiments, the nut 304 is fixedly attached or connected to the housing 310. The leadscrew 302 may be operably connected at one or both ends to surfaces and/or structures of an aircraft, with such surface and/or structure, or part thereof, configured to be moved or actuated by linear or axial movement of the leadscrew 302 along an axis A.

In operation, the nut 304 may be rotated to drive axial movement of the leadscrew 302. In other configurations, the axial movement of the leadscrew 302 may drive rotation of the nut 304. In such configuration, the component/structure/feature to be driven by the actuator 300 may be operably coupled to the nut 304 and/or the housing 310. It will be appreciated that the specific output operation (e.g., from leadscrew 302 or nut 304) is not intended to be limiting, but rather is reflective of the specific application and intended use of the actuator 300.

In the actuator 300 of this embodiment, an insert 312 is arranged between the leadscrew 302 and the nut 304. The insert 312 is configured to fit between the external thread 306 of the leadscrew 302 and the internal thread 308 of the nut 304. The insert 312 may be formed of a material that is different from the material of each of the leadscrew 302 and the nut 304. For example, in one non-limiting example, each of the leadscrew 302 and the nut 304 may be formed from a metal and the insert 312 may be formed from a polymer. In some non-limiting examples, the metallic leadscrew 302 and nut 304 may be formed from steel (e.g., corrosion resistant or non-corrosion resistant), titanium, copper-based alloys, and the like and the insert 312 may be formed from virgin and filled grades of Polyamides, PEEK, PAEK, with fillers being, for example, graphite, carbon, and/or PTFE at various proportions to improve wear performance.

Referring now to FIG. 3B, a schematic illustration of the leadscrew 302 with the insert 312 installed thereto is shown and FIG. 3C illustrates the insert 312 in isolation. As shown, the external thread 306 of the leadscrew 302 forms a generally squared shape for a space 314 defined between axially adjacent portions of the external thread 306. The insert 312 has a cross-sectional shape that matches or complements the shape of the space 314. As such, in this example, because the space 314 has a generally squared shape or geometry, the insert 312 has a squared cross-sectional shape, as illustratively shown in FIG. 3C.

The insert 312 may be fixedly attached to a specific portion of the leadscrew 302. The attachment of the insert 312 to the leadscrew 302 may be by known means to enable attaching two different material components. For example, bonding, adhesives, mechanical fixing, or the like may be used to secure the insert 312 within the space 314 between the external thread 306 of the leadscrew 302. In some embodiments, one or more end stops 316 may be arranged at ends of the insert 312, as shown in FIG. 3B. The end stops 316 may, in some embodiments, be formed of a material different from the leadscrew 302 and the insert 312. For example, the end stops 316 may be formed of metallic materials either chemically bonded or mechanically retained within or to the nut. In some embodiments, the end stops 316 may be fixedly attached or mounted to the leadscrew 302 and the insert 312 is not fixedly attached to the leadscrew 302. In such an embodiment, the end stops 316 may be used to maintain and hold the insert 312 in position relative to the leadscrew 302 and/or the nut 304.

As described above, the insert 312 is attached to the leadscrew 302. However, in other embodiments, the insert 312 may be fixedly attached to the nut 304 and not attached to the leadscrew 302. In some such embodiments, the configuration can include one or more end stops similar to that shown in FIG. 3B.

Referring back to FIG. 3A, the insert 312 prevents direct material contact between the leadscrew 302 and the nut 304. As such, metal-to-metal contact may be avoided. During operation, as the leadscrew 302 rotates relative to the nut 304, the insert 312 will transfer force between the external threads 306 of the leadscrew 302 and the internal threads 308 of the nut 304. The insert 312 may be configured to enable transfer of high loads, such as about 1-20 kN (or about 200-4,500 lb) and speeds up to 0.5 m/s.

Figure 4A:
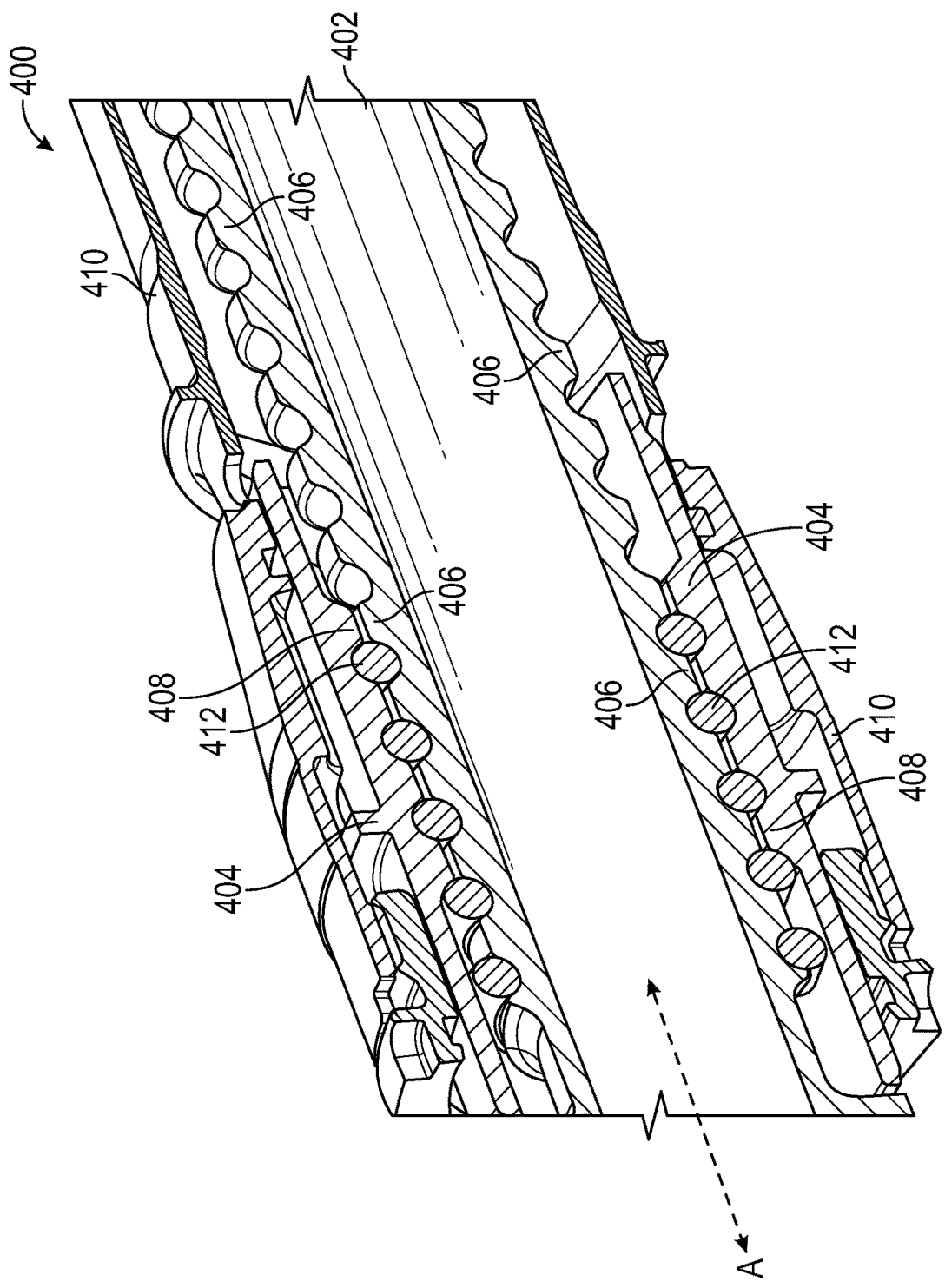
FIG. 4A is a schematic illustration of an actuator in accordance with an embodiment of the present disclosure.
Figure 4B:
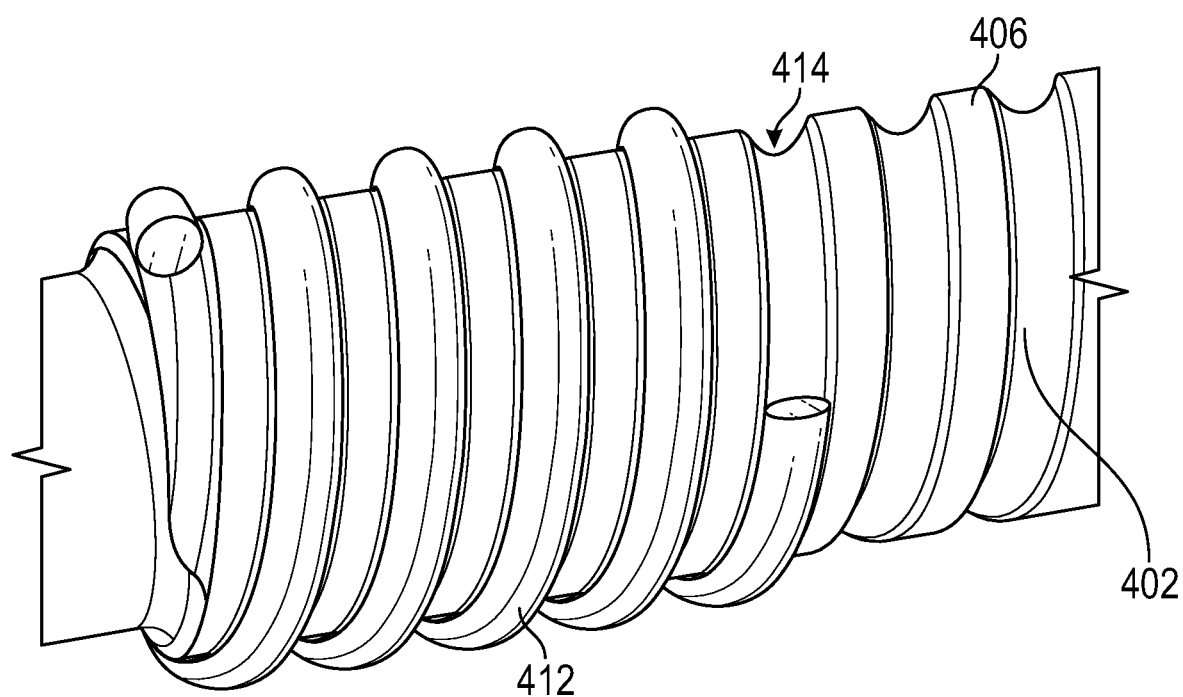
FIG. 4B is an enlarged view of a leadscrew and insert of the actuator of FIG. 4A in accordance with an embodiment of the present disclosure.
Figure 4C:
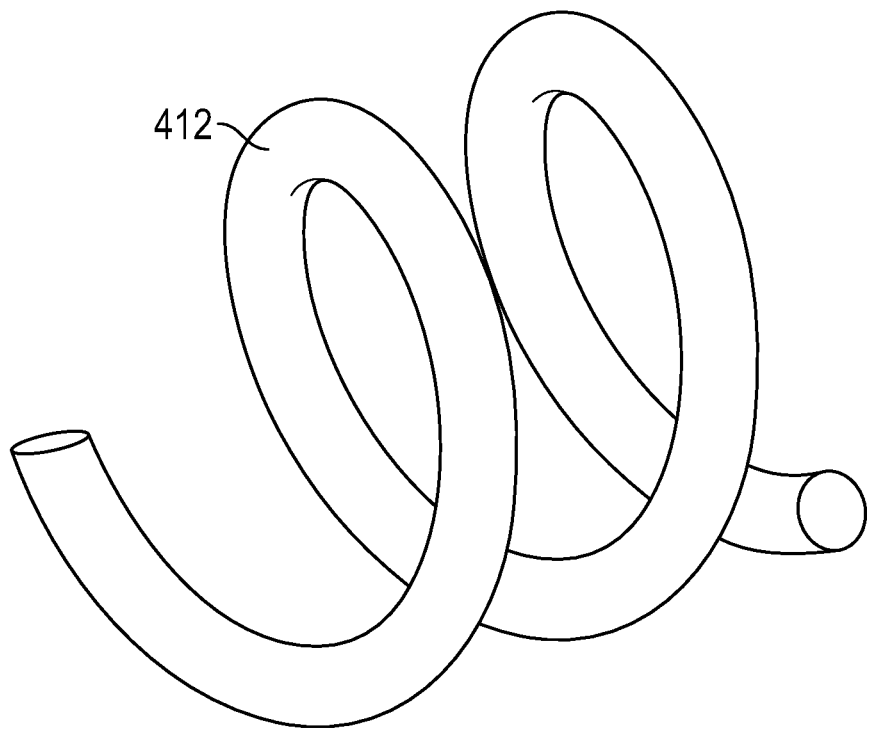
FIG. 4C is an enlarged view of the insert of the actuator of FIG. 4A in accordance with an embodiment of the present disclosure.

Turning now to FIGS. 4A-4C, schematic illustrations of an actuator 400 with an embodiment of the present disclosure are shown. The actuator 400 may be configured for use onboard an aircraft and may be installed and arranged to enable actuation or operation of one or more components, systems, or devices onboard the aircraft. The actuator 400 is similar to that shown and described above with respect to FIGS. 3A-3C. For example, the actuator 400 includes a leadscrew 402 and a nut 404. The leadscrew 402 includes an external thread 406 and the nut 404 includes an internal thread 408. The nut 404 is arranged within a housing 410. The leadscrew 402 may be operably connected at one or both ends to surfaces and/or structures of an aircraft, with such surface and/or structure, or part thereof, configured to be moved or actuated by linear or axial movement of the leadscrew 402 along an axis A.

In operation, the leadscrew 402 and the nut 404 may be rotated relative to each other to either rotate the nut 404 and/or drive axial movement of the leadscrew 402. An insert 412 is arranged between the leadscrew 402 and the nut 404. The insert 412 is configured to fit between the external thread 406 of the leadscrew 402 and the internal thread 408 of the nut 404.

As illustrated in FIGS. 4A-4C, the external thread 406 of the leadscrew 402 forms a generally rounded or circular shape for a space 414 defined between axially adjacent portions of the external thread 406. The insert 412 has a cross-sectional shape that matches or complements the shape of the space 414. As such, in this example, because the space 414 has a generally circular shape or geometry, the insert 412 has a circular cross-sectional shape, as illustratively shown in FIGS. 4A-4C. In this configuration, in contrast to the embodiment of FIGS. 3A-3C, no end stops are included. The insert 412 may be fixedly attached (e.g., bonded or otherwise attached) to the leadscrew 402 or the nut 404, depending on the specific configuration to be implemented. Due to the direct attachment between the insert 412 and the other component, the end stops may be omitted.

Figure 5B:
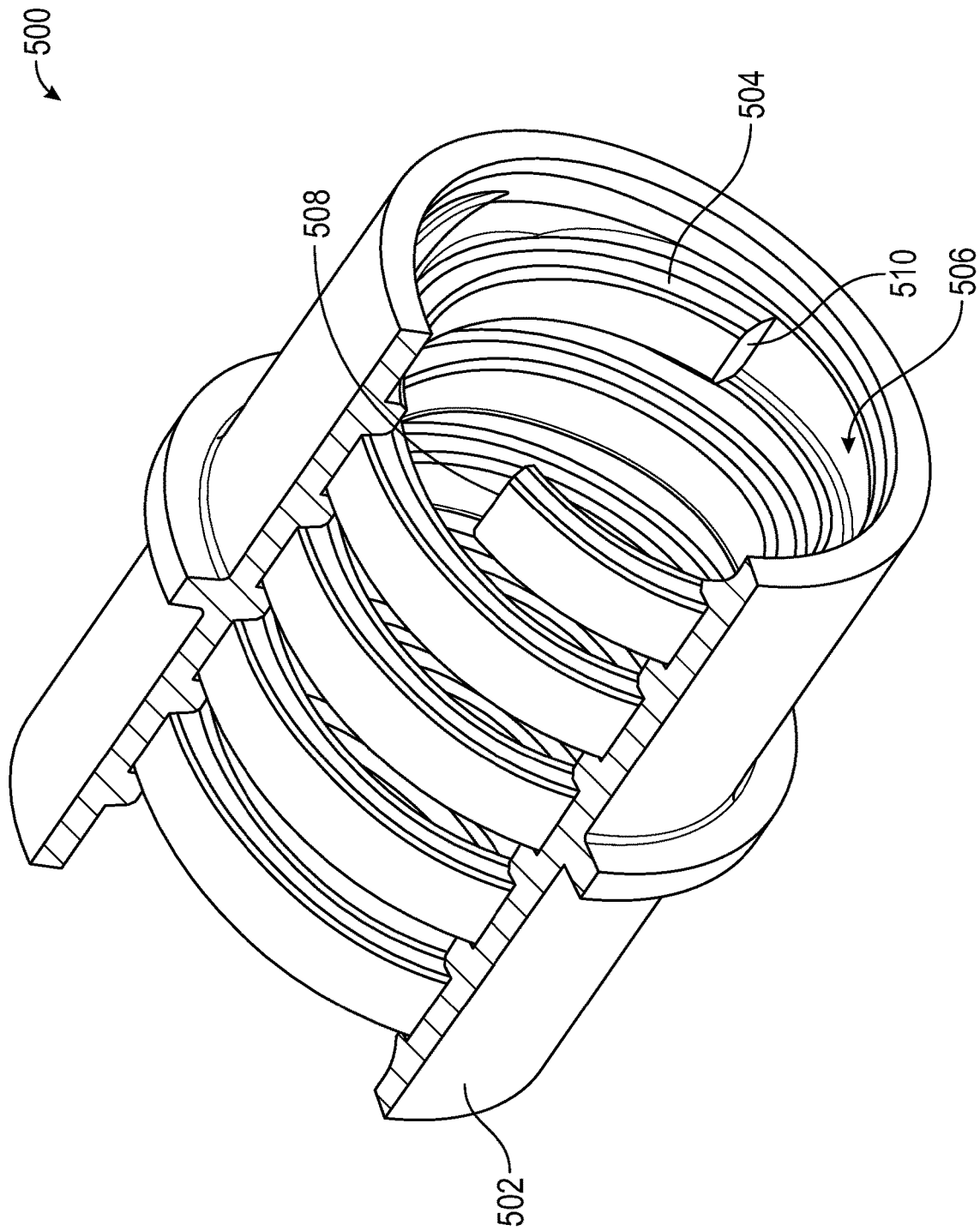
FIG. 5B is a partial cut-away illustration of the actuator of FIG. 5A.
Figure 5C:
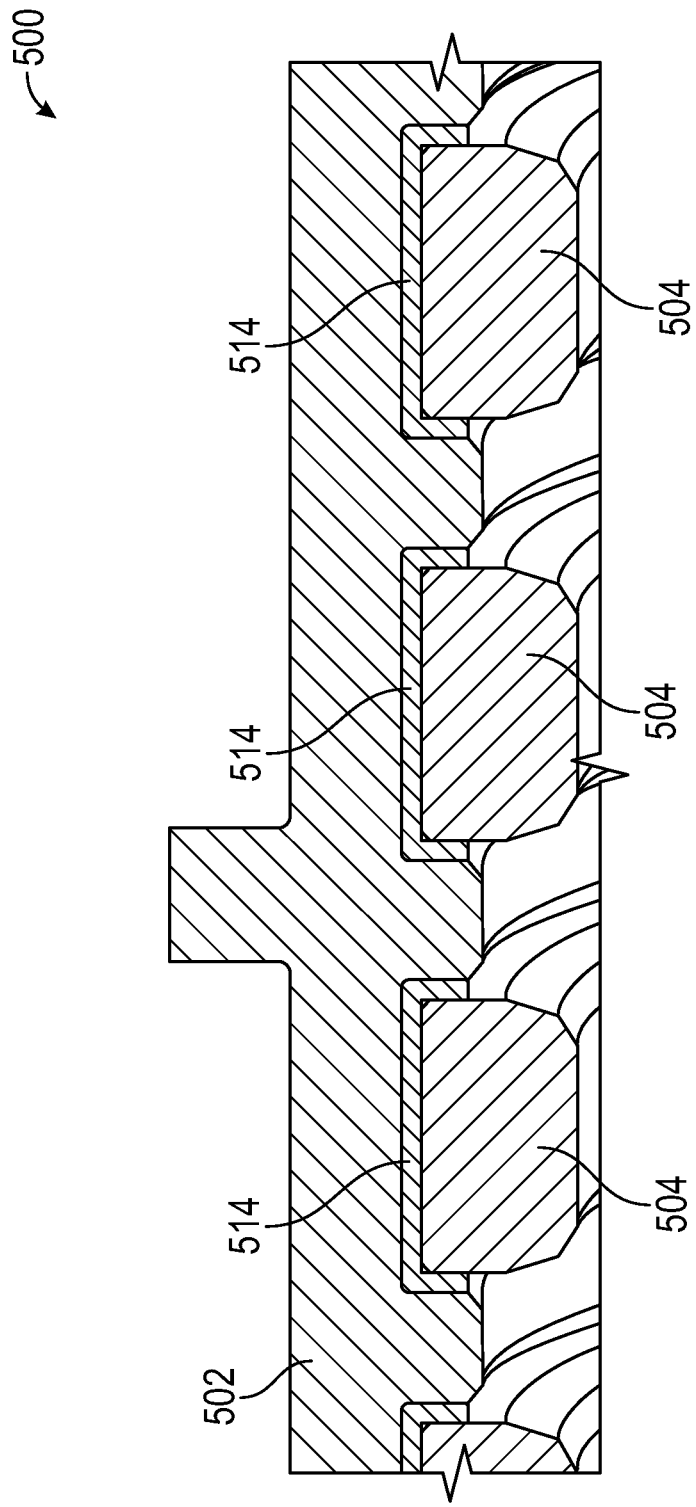
FIG. 5C is an enlarged illustration of retention of an insert within a nut of the actuator of FIG. 5A.

Referring now to FIGS. 5A-5C, schematic illustrations of a portion of an actuator 500 in accordance with an embodiment of the present disclosure. The actuator 500 includes a nut 502 with an insert 504 installed thereto. As shown, insert 504 is installed into a thread 506 of the nut 502. In this configuration, the insert 504 is a two-start insert coil, having a first start 508 and a second start 510. As a result of the two-start insert coil, the insert 504 may be formed of two separate windings to accommodate the threads 506 (or configuration thereof) of the nut 502. The insert 504 may be fixedly attached to the nut 502 by adhesive bonding 514, similar to that described above. Further, the insert 504 may be retained and positioned within the threads 506 of the nut 502 by one or more mechanisms, including the adhesive bonding 514. Such additional retention and positioning features may include, for example, a grub screw installed tangential to helical coil/insert and/or inserts placed at the ends of the insert 504. In some such configurations, the nut 504 can include a cut outs with the inserts placed into the cutouts by approaching from either inside or outside and retained by a cylinder and screw shaft.

The inserts of the present disclosure may be machined or molded. As the inserts are installed about or within a thread of a leadscrew or nut, the inserts will have a helical structure having a defined cross-sectional shape/geometry to match or complement the thread. When placed between metallic nuts and leadscrews the inserts will prevent metal to metal contact. In some embodiments, the insert may be held captive within the nut (e.g., by mechanical or bonding methods). This captive retention can prevent the inserts from winding out during actuation of the leadscrew. In some embodiments, multiple inserts may be arranged in sequence about the threads of the nut or leadscrew. This configuration can lead to a multi-start insert configuration that enables distribution or sharing of loads carried by the insert, thus increasing the overall load capability of the actuator.

Advantageously, the inserts for actuators described herein enable extending the benefit of a polymeric nut to higher load applications by using a polymeric insert arranged between metallic components (e.g., leadscrew and nut). The inserts may be formed to tailor a flank width to reduce contact pressures, which in turn can result in lower pressure-velocity ("pv"). The inserts described can achieve longevity of actuators due to low wear behavior of the insert and avoidance of metal-to-metal contact/wear between threads of a leadscrew and a nut of the actuator.

The use of the terms "a", "an", "the", and similar references in the context of description (especially in the context of the following claims) are to be construed to cover both the singular and the plural, unless otherwise indicated herein or specifically contradicted by context. The modifiers or terms "about" and/or "substantially" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A leadscrew and nut actuator comprising:
    a leadscrew having an external thread and formed from a first material;
    a nut configured to receive the leadscrew, the nut having an internal thread and formed from a second material; and
    an insert having a helical structure arranged between the internal thread of the nut and the external thread of the leadscrew, the insert configured to transfer force between the external thread and the internal thread and prevent material contact between the leadscrew and the nut;
    at least one end stop fixedly attached to the leadscrew and arranged within a space between axially adjacent portions of the external thread and at each end of the insert and configured to retain the position of the insert relative to the leadscrew,
    wherein the insert is formed of a third material different from the first material and the second material.

2. The leadscrew and nut actuator of claim 1, wherein the first material and the second material are metals.

3. The leadscrew and nut actuator of claim 1, wherein the first material and the second material are the same material.

4. The leadscrew and nut actuator of claim 1, wherein the third material is a polymer.

5. The leadscrew and nut actuator of claim 1, wherein the insert is fixedly attached to the nut within the internal thread.

6. The leadscrew and nut actuator of claim 1, wherein the insert is fixedly attached to the leadscrew within the external thread.

7. The leadscrew and nut actuator of claim 1, wherein the external thread defines a space between axially adjacent portions of the external thread, wherein the space has a geometric profile and the insert has a cross-sectional shape that matches the geometric profile of the space.

8. The leadscrew and nut actuator of claim 1, wherein the internal thread defines a space between axially adjacent portions of the internal thread, wherein the space has a geometric profile and the insert has a cross-sectional shape that matches the geometric profile of the space.

9. The leadscrew and nut actuator of claim 1, wherein the insert has a rounded cross-sectional shape.

10. The leadscrew and nut actuator of claim 1, wherein the insert has a squared cross-sectional shape.

11. The leadscrew and nut actuator of claim 1, further comprising an additional insert arranged between the internal thread of the nut and the external thread of the leadscrew.

12. The leadscrew and nut actuator of claim 1, wherein the leadscrew is operably connected to a component of an aircraft.

13. The leadscrew and nut actuator of claim 1, wherein the nut is operably connected to a component of an aircraft.

14. The leadscrew and nut actuator of claim 1, wherein at least one of the leadscrew and the nut are formed of a corrosion resistant steel, titanium, a non-corrosion resistant steel, and a copper based alloy.

15. The leadscrew and nut actuator of claim 1, wherein the insert is formed from one of Polyamides, PEEK, PAEK, and PTFE.

16. The leadscrew and nut actuator of claim 15, wherein the material of the insert includes a filler.

17. The leadscrew and nut actuator of claim 16, wherein the filler comprises graphite or carbon.

18. A leadscrew and nut actuator comprising:
- a leadscrew having an external thread and formed from a first material;
- a nut configured to receive the leadscrew, the nut having an internal thread and formed from a second material; and
- an insert having a helical structure arranged between the internal thread of the nut and the external thread of the leadscrew, the insert configured to transfer force between the external thread and the internal thread and prevent material contact between the leadscrew and the nut;
- at least one end stop fixedly attached to the nut and arranged within a space between axially adjacent portions of the internal thread and at each end of the insert and configured to retain the position of the insert relative to the nut,
- wherein the insert is formed of a third material different from the first material and the second material.

19. The leadscrew and nut actuator of claim 18, wherein the third material is a polymer.

* * * * *